United States Patent Office 2,756,189
Patented July 24, 1956

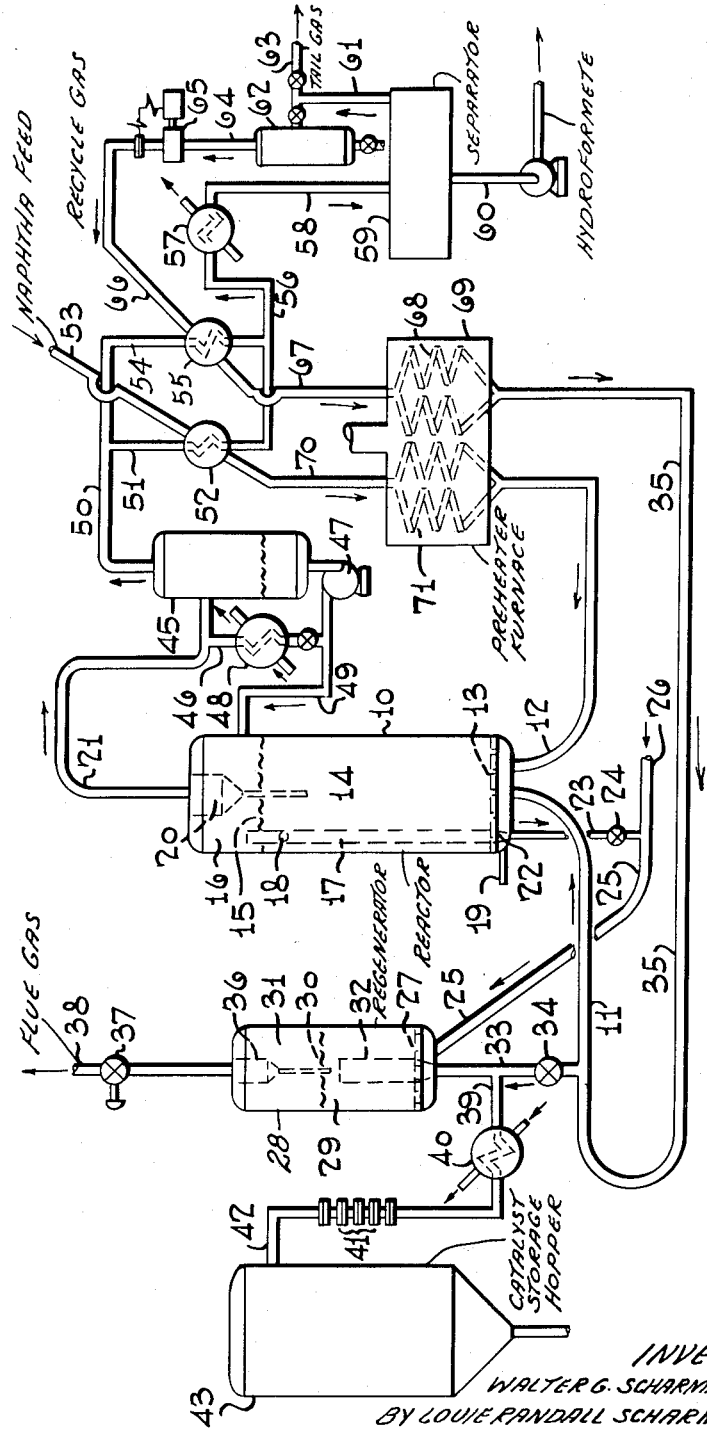

2,756,189

FLUID HYDROFORMING PROCESS

Walter G. Scharmann, deceased, late of Westfield, N. J., by Louie Randall Scharmann, executrix, Westfield, N. J., and Arnold F. Kaulakis, Chatham, N. J., assignors to Esso Research and Engineering Company, a corporation of Delaware Application June 28, 1951, Serial No. 234,026

4 Claims. (Cl. 196—50)

This invention pertains to the catalytic conversion of hydrocarbon fractions and particularly to the conversion of hydrocarbon fractions boiling within the motor fuel boiling range of low knock rating into high octane number motor fuels. Specifically this invention pertains to an improved process for upgrading hydrocarbon fractions boiling within the motor fuel or naphtha range by hydroforming or aromatizing the same in a fluidized solids reactor system.

Hydroforming is a well known and widely used process for treating hydrocarbon fractions boiling within the motor fuel or naphtha range to upgrade the same or increase the aromaticity and improve the anti-knock characteristics of said hydrocarbon fractions. By hydroforming is ordinarily meant an operation conducted at elevated temperatures and pressures in the presence of solid catalyst particles and hydrogen whereby the hydrocarbon fraction is increased in aromaticity and in which operation there is no net consumption of hydrogen. Hydroforming operations are usually carried out in the presence of hydrogen at temperatures of 750°–1150° F. in the pressure range of about 50–3000 lbs. per sq. in. and in contact with such catalysts as molybdenum oxide, chromium oxide, or in general oxides or sulfides of metals of groups IV, V, VI, VII and VIII of the periodic system of elements alone, or generally supported on a base or spacing agent such as alumina gel, precipitated alumina or zinc aluminate spinel. A good hydroforming catalyst is one containing about 10 wt. per cent molybdenum oxide on an aluminum oxide base prepared by heat treating a hydrated aluminum oxide. A more heat stable support or spacing agent than alumina may be prepared by combining aluminum oxide with zinc oxide preferably in molecular proportions thereby forming a zinc aluminate spinel.

It has been proposed in application Serial No. 188,236, filed October 3, 1950, now U. S. Patent 2,689,823, to effect the hydroforming of naphtha fractions in a fluidized solids reactor system in which naphtha vapors are passed continuously through a dense, fluidized bed of hydroforming catalyst particles in a reaction zone, spent catalyst particles being continuously withdrawn from the dense bed and passed to a separate regeneration zone where inactivating carbonaceous deposits are removed whereupon the regenerated catalyst particles are returned to the main reactor vessel. In the process disclosed in said patent application operation has been limited to low catalyst to oil ratios (around 1:1) by selectivity considerations, since higher ratios resulted in excessive carbon formation. Moreover high regeneration temperatures have not been possible due to steam deactivation of the catalyst. These factors limted the transfer of heat from the regenerator to the reactor via the catalyst and made it necessary to provide cooling coils in the regenerator and to provide furnaces or other means for supplying heat to the reactor either directly or indirectly through the reactants and/or the hydrogen-rich recycle gas.

It is the object of this invention to provide a process whereby hydrocarbon fractions boiling within the motor fuel range may be hydroformed in an advantageous manner by the fluidized solids technique.

It is a further object of this invention to provide a process whereby hydrocarbon fractions boiling within the motor fuel range may be hydroformed in contact with a dense fluidized bed of catalyst particles at higher catalyst to oil ratios.

It is also the object of this invention to provide a process whereby hydrocarbon fractions boiling within the motor fuel boiling range may be hydroformed in contact with a dense fluidized bed of catalyst particles which catalyst particles are continuously withdrawn from the reactor bed, partially freed of carbonaceous deposits and recycled to the reactor bed.

These and other objects will appear more clear from the detailed specification and claims which follow.

It has now been found that the hydroforming of petroleum fractions boiling within the motor fuel boiling range by the fluidized solids technique can be carried out to greater advantage if spent catalyst withdrawn from the dense fluidized catalyst bed in the reactor zone is, preferably after stripping with steam or other suitable stripping gas, introduced into a regenerator where the spent catalyst particles are retained for a sufficient period to burn off only part of the carbonaceous deposits whereupon the partially regenerated catalyst particles, still carrying from 1.0 to 4.0 wt. per cent carbon are returned to the reactor. The greatest advantages are realized when, in addition to operating with 1.0 to 4.0 wt. per cent of carbon on the regenerated catalyst, the amount of catalyst in the dense bed in the reactor and the catalyst circulation rate are so correlated as to maintain a catalyst to oil ratio of from about 5 to about 20, preferably from 5 to 10, with a catalyst residence time in the reactor of at least 10 minutes and preferably about 20 minutes. By this combination of expedients it is possible to avoid oxidation and reduction of the catalytic metal oxide component reducing the amount of oxygen required for regeneration and minimizing consumption of hydrogen for the reduction or reactivation of the catalyst while at the same time achieving a substantial reduction in the amount of coke or carbon formed in the conversion thereby further reducing oxygen requirements for regeneration of the catalyst. Moreover, by operating the process at high catalyst to oil ratios, i. e. 5 to 15, it is possible to carry the necessary heat of reaction into the reaction zone by means of the catalyst thereby avoiding thermal degradation of the feed stock through preheating to excessively high temperatures and reducing the amount of recycle gas needed for supplying the endothermic heat of reaction.

The present process is applicable to the hydroforming or aromatizing of virgin naphtha, cracked naphtha, Fischer-Tropsch naphtha or the like of a broad boiling range, i. e., from about 180°–430° F. or it may also be applied to the treatment of a narrow boiling fraction such as a $C_6$–$C_7$ cut.

Catalysts that may be used in accordance with the present invention include the common hydroforming catalysts, preferably group VI metal oxides or sulfides upon suitable supports or spacing agents. Molybdenum oxide or chromium oxide on activated alumina or upon zinc aluminate spinel are particularly suitable.

The hydroforming or aromatizing operation is effected at pressures within the range of about 50 to 500 p. s. i. g., preferably at 200–250 p. s. i. g. at temperatures of 850°–1050° F., preferably at about 900°–1000° F. The throughput of naphtha or fresh feed should be between 0.2 to 2.0 w./hr./w., preferably 0.5–1.0 w./hr./w., with recycle gas of 40–80 per cent hydrogen content used at the rate of 2000–4000 cu. ft. per barrel of fresh feed. The recycle gas should be preheated to temperatures of between about 1000° and 1200° F. The catalyst to oil ratio should be between 5 and 15 and is preferably between 5 and 10. The regeneration temperature should be between about 1050° and 1175° F.

The catalyst should be retained in the reactor vessel at least about 10 minutes and preferably about 20 minutes. In some cases it may be desirable to have a catalyst residence time in the reactor as high as one to two hours.

Reference is made to the accompanying drawing illustrating a diagrammatic flow plan of the process in accordance with the present invention.

In the drawing, 10 is a reactor vessel provided with an inlet line 11 for the supply of solid catalyst particles preferably supported or conveyed by a stream of hydrogen-rich recycle gas and a separate inlet line 12 for the introduction of fresh naptha feed. A horizontal, perforated plate or grid 13 is arranged near the bottom of vessel 10 for distributing the incoming solid particles and vaporous materials uniformly over the entire cross section of the vessel. A charge or bed of finely divided hydroforming catalyst particles is established in reactor vessel 10 above grid member 13. Suitable catalysts include group VI metal oxides, such as molybdenum, chromium or tungsten oxide or mixtures thereof alone or preferably upon a support or carrier such as activated alumina, zinc aluminate spinel or the like. Other suitable catalysts or carriers may be used. The catalyst particles are, for the most part between 200 and 400 mesh in size or about 0–200 microns in diameter with a major proportion between 20 and 80 microns. The catalyst particles are supplied to the reactor through line 11 in suspension in a hydrogen-rich gas. In starting up the process for the first time, the hydrogen-containing gas may be supplied from an extraneous source. The process, however, normally evolves hydrogen which is advantageously recycled to the reactor. The naphtha and the hydrogen-containing gas are passed as a mixture up through the reaction zone at superficial velocity of about 0.2 to 0.9 ft. per second at reactor conditions depending upon the pressure. For example, the velocity should be below about 0.6 feet per second in the pressure range of 200–250 lbs. per sq. inch gauge. The velocity should be sufficient to maintain a dense, turbulent, liquid simulating bed 14 of solids and gas having a definite level 15 with a dilute phase suspension of catalyst solids in gas 16 thereabove. Lower linear gas velocities are used for higher pressures to obtain dense, fluidized beds. If desired, the reactor vessel 10 may be provided with horizontally arranged perforated baffles spaced vertically therein or vertically arranged and spaced baffles to improve the contacting of the hydrocarbon vapors with the catalyst.

A vertical internal conduit 17 is provided in the reactor 10 for the withdrawal of catalyst directly from the dense bed 14. The upper end of the conduit 17 extends above the level 15 of the dense bed and has openings or ports 18 at one or more points along its length to permit flow of catalyst from the dense bed into the conduit. Inasmuch as the catalyst and hydrocarbons are introduced at the lower end of reactor 10 and the product vapors pass overhead and catalyst particles are removed from the upper part of dense bed 14, there is a general concurrent flow of hydrocarbon vapors and catalyst in the reactor 10. The port 18 should be located well up in the dense bed 14 to obtain maximum concurrent flow of catalyst and oil vapors up through the bed 14 but the port should be a sufficient distance below the level 15 to take care of any normal fluctuations in the level of the bed. More than one orifice or port may be provided at different levels in conduit 17 and each port may be provided with valves or control means to regulate the flow of catalyst into the conduit 17.

Steam or an inert gas such as nitrogen, flue gas or the like or mixtures thereof are supplied to conduit 17 through line 19 near the base of conduit 17 to displace, strip off or desorb hydrogen, hydrocarbon reactants or reaction products flowing into conduit 17 with the catalyst particles, the stripping gas passing upwardly through conduit 17 counter current to the downflowing catalyst. The superficial velocity of the stripping gas should be equal to or higher than the superficial velocity of the vapors and gases passing upwardly through reactor 10.

The stripping gas and stripped out constituents are discharged from the top of conduit 17 into the dilute phase 16 and are combined with the reaction product vapors leaving the dense bed 14 and the resultant mixture is then passed through one or more cyclone separators 20 or the like to remove entrained catalyst particles and then withdrawn through line 21 to suitable heat and product recovery equipment. Stripping the catalyst particles during withdrawal from the reactor vessel decreases the amount of combustible material that must be burned during the regeneration of the catalyst. If desired, a separate external stripping vessel may be used for the stripping step with the stripping gas and stripped out material leaving the stripper being conducted to the dilute phase 16 in the reactor and thence to outlet line 21 or to separate recovery means.

The lower end of conduit 17 is necked down or reduced as at 22 and forms a standpipe 23 having a smaller diameter than conduit 17. This standpipe serves to develop additional pressure necessary to overcome the pressure drop through the regeneration system. Under elevated pressure conditions obtaining in the reaction system the catalyst flowing from the enlarged section 17 into the reduced section 22 will carry entrained or trapped gas with it in an amount sufficient to maintain it in freely flowing fluid condition and this condition should be maintained during passage of the catalyst through the standpipe section 23. If necessary, some additional gas may be added at one or more spaced points in the standpipe section 23. However, as the process is ordinarily carried out under pressures of about 100 lbs./sq. inch or higher, and is much higher than the pressure drop through the regeneration system, the amount of pressure build up by the standpipe is relatively small compared to the pressure in the process, consequently there is less compression of the gas entering the top of standpipe 23 as the solid catalyst particles move down therein so that in most cases there is no need for adding additional aeration gas to standpipe 23. This is particularly true if in section 23 the rate of downflow of solids is relatively high so as to prevent catalyst from being deaerated. By making the diameter of the standpipe 23 relatively small as compared with the stripping section 17 the velocity of the solids through the standpipe section will be increased thus reducing the tendency to deaerate the catalyst. A valve 24 is provided near the base of the standpipe to control the rate of withdrawal of stripped catalyst from the standpipe.

Catalyst is discharged from the base of standpipe 23 into conduit 25 wherein the catalyst particles are picked up by a stream of air or other carrier gas supplied through inlet line 26 and conveyed thereby through perforated plate or grid 27 into regenerator 28, where carbonaceous deposits are removed to a certain extent from the catalyst particles. Since the rate of burning of the carbonaceous deposits from hydroforming catalysts is very high and tends to cause overheating of the catalyst particles, it is advisable to utilize an inert gas such as nitrogen or flue gas or only a portion of the regeneration air to convey the spent catalyst through conduit 25 and to introduce the air necessary for regeneration directly into the regenerator, preferably at spaced points and through a plurality of nozzles (not shown) in order to insure uniformity of temperature throughout the body of catalyst undergoing regeneration.

The velocity of the gas passing upwardly through the regenerator 28 is controlled to maintain a lower dense, highly turbulent, fluidized bed 29 of catalyst and gas having a definite level 30 and superposed by a dilute dispersion 31 of catalyst particles in regeneration gas. To accomplish this the superficial velocity of the regenerating gas in regenerator 28 may range from 0.3 to 1.5 ft. per second depending upon the pressure, for example, below 1.0 ft. per second at a regeneration pressure of about 200–250 lbs. per sq. inch. A conduit 32 is arranged within the regenerator 28 for the withdrawal of regenerated catalyst particles directly from the dense fluidized bed 29. The conduit 32 may have its upper end beneath the level of the fluidized bed as shown or it may be constructed similarly to the conduit 17 in reactor 10 and extend into the dilute phase and have one or more restriction inlets for the withdrawal of regenerated catalyst from dense bed 29. The conduit 32 extends downwardly through grid 27 and is necked down to form a standpipe with section 33. The regenerated catalyst may be subjected to stripping with steam or hydrogen as it passes through conduits 32 and 33. A slide or other control valve 34 is provided near the base of standpipe 33 to regulate the flow of regenerated catalyst from the standpipe into inlet line 11 and thence into reactor vessel 10. Hydrogen-containing gas, preferably recycle gas, is supplied through line 35 for conveying the regenerated catalyst from the base of standpipe 33 into the reactor vessel 10.

Regeneration of the catalyst in regenerator 28 is controlled to retain substantial amounts of carbonaceous materials upon the regenerated catalyst particles. Specifically the regeneration should be so conducted that the regenerated catalyst contains from 1.0 to 4.0 per cent of carbon preferably from 1 to 2 wt.per cent on the catalyst. At carbon contents of this order, it is possible not only to prevent or minimize oxidation of the catalytic metal component but it is also possible to control catalyst activity and selectivity and thereby permit fluid hydroforming operation at catalyst circulation rates compatible with heat balance requirements and at the same time obtain improved yield-octane relationships. It is also possible in this way to avoid the use of excess air for regeneration which is particularly advantageous since additional compressor capacity would be necessary to bring the excess air up to regeneration pressure. The avoidance of the oxidation of the catalytic metal component is also of advantage in minimizing or avoiding the reduction of the regenerated catalyst during its transfer from the regenerator to the reactor, thereby avoiding any overheating and consequent reactivation of the catalyst at this stage.

Regeneration gases are taken overhead from regenerator 28 through one or more cyclone separators 36 which remove entrained catalyst. The gases then pass through a pressure reducing valve 37 to stack or flue 38. In order to control the amount of catalyst in the system provision may be made for introducing or removing catalyst as follows.

Hot catalyst may be withdrawn from the regenerated catalyst standpipe 33 through line 39 and passed through catalyst cooler 40. The pressure on the catalyst is then released in stages by passing the catalyst through fixed orifices 41. The depressured catalyst is then discharged through line 42 into catalyst storage hopper 43. Catalyst may be conveyed from the storage hopper into the reactor system in various ways, for example in a high pressure gaseous stream through connections (not shown) into inlet line 11 or preferably by charging catalyst from hopper 43 to a tank where it is formed into a pumpable slurry with feed naphtha whereupon the slurry is pumped through suitable control valves to distributor nozzles in the reactor.

Returning again to the reactor 10, the reaction products are, as stated above, taken overhead from the reactor after passing through one or more cyclone separators 20 which remove a major part of the entrained catalyst whereupon the vaporous reaction products are passed through line 21 into separator vessel 45. A quenching oil, which may be a heavy polymer formed in the process, is sprayed into line 21 from line 46. The amount and temperature of the quenching oil introduced into the stream of vaporous reaction products should be sufficient to cool the vapors below the vaporization temperature of the quenching oil. The resulting mixture comprising small quenching oil droplets, gaseous and vaporous reaction products and small amounts of catalyst particles is discharged tangentially into separator drum 45 wherein the catalyst particles become entrapped in the oil droplets and are separated by centrifugal action. A slurry of catalyst in polymer or quenching oil collects at the bottom of separator 45 and is withdrawn by means of pump 47. A portion of this slurry is passed through cooler 48 and thence through line 46 into line 21 as described above while the remainder is passed through line 49 to suitable nozzles arranged in the upper part of the reactor thereby returning the bulk of the recovered catalyst to the reactor system without subjecting the quench oil or heavy polymer to reaction conditions for an appreciable length of time. This is particularly desirable since the polymer oil forms large amounts of carbon when subjected to reaction conditions in the dense bed 14.

The stream of gaseous and vaporous reaction products is taken overhead from separator drum 45 through line 50 and a portion may be passed through line 51 and heat exchanger 52 to preheat fresh naphtha feed supplied through line 53 while the remainder is passed via line 54 through heat exchanger 55 for preheating the hydrogen-containing recycle gas supplied through line 66. The partially cooled stream of gaseous and vaporous reaction products is then passed via line 56 through condenser 57 which serves to condense the hydroformate. Products from condenser 57 pass through line 58 to separator 59 in which liquid hydroformate is separated from uncondensed gases. The liquid hydroformate is withdrawn from the bottom of separator 59 through line 60 and is pumped to suitable stabilizing and re-run equipment and to product storage (not shown). The uncondensed gases which contain a high percentage of hydrogen are taken overhead from separator 59 through line 61 and passed through knock-out drum 62 to remove any entrained liquid. Excess process gas may be withdrawn through line 63 as tail gas and either flared or used as fuel. The process gas relatively free of liquid is withdrawn from knock-out drum 62 through line 64 compressed in compressor 65 and passed thence into line 66 through heat exchanger 55, wherein it is preheated by indirect heat exchange with hot reaction products as described above. The preheated hydrogen-rich gas is then passed via line 67 through coils 68 in furnace 69 wherein the gas is heated sufficiently above the reaction temperature to supply the additional heat of reaction required over and above that supplied by hot regenerated catalyst and preheated feed. The superheated recycle gas is discharged from heater coils 68 into line 35 and passes therethrough to inlet line 11 wherein it picks up regenerated catalyst and passes into the reactor vessel 10 as described above. The fresh naphtha feed supplied to line 53 is preheated by passage in indirect heat exchange relation to the hot reaction product vapors and gases in heat exchanger 52. The preheated feed then passes via line 70 through heater coils 71 in furnace 69 wherein the naphtha is heated to as high a temperature as is possible without causing thermal decomposition of the naphtha. The naphtha is discharged from heater coils 71 into inlet conduit 12 and is conducted therethrough into the reactor vessel 10 as described above.

The following table summarizes data obtained in the fluid hydroforming of a heavy (200°/430° F.) virgin naphtha stock at 200 lbs. per sq. inch at 900° F. in contact with a molybdenum oxide on alumina catalyst in a conventional operation with small amounts of carbon left on regenerated catalyst using a low catalyst to oil ratio as previously indicated and at a high catalyst to oil ratio with low carbon on regenerated catalyst and an operation carried out to form a hydroformate of essentially the same characteristics but in which larger amounts of carbon are retained upon the regenerated catalyst.

*Table I*

| Catalyst/Oil Ratio | 1-2 | 10 | 10-18 |
|---|---|---|---|
| Carbon on Reg. Catalyst | 0-0.7 | 0-0.7 | 1.5-2.0 |
| CFR-R of C₄430° F | 98.0 | 98.0 | 98.0 |
| Carbon, Wt. Percent FF | 0.6 | 2.8- 4.0 | 0.6 |
| Dry Gas, Wt. Percent FF | 16.4 | 13.5-12.3 | 16.4 |
| C₄—430° F., Wt. Percent FF | 83.0 | 83.7 | 83.0 |

It may readily be seen from this table that when a catalyst to oil ratio of 10 was used with small quantities of carbon on the regenerated catalyst, carbon formation was more than quadrupled. The use of high catalyst to oil ratios does not, however, produce an increase in carbon formation when larger amounts of carbon (1.5 to 2.0 wt. per cent) are retained on the regenerated catalyst. The use of higher catalyst to oil ratios with large amounts of carbon on the regenerated catalyst facilitates the transfer of heat from the regeneration zone to the reaction zone.

The foregoing description contains a limited number of embodiments of the present invention. It will be understood, however, that numerous variations are possible without departing from the scope of the following claims.

What is claimed is:

1. A method of hydroforming a hydrocarbon fraction boiling within the motor fuel boiling range which comprises passing naphtha vapor in admixture with hydrogen-rich gas through a dense, fluidized bed of finely divided group VI metal compound hydroforming catalyst in a reaction zone at temperatures of 850°–1050° F. and at pressures of 100–500 lbs. per sq. inch at a catalyst to oil ratio of 5 to 20 and at a throughput of 0.2 to 2.0 w./hr./w., withdrawing a stream of reaction products substantially free of catalyst particles overhead from the reaction zone, withdrawing a stream of catalyst particles directly from the dense fluidized bed in said reaction zone, stripping adsorbed hydrogen and hydrocarbon material from the withdrawn catalyst, regenerating the stripped catalyst particles by burning off at most only a part of the carbonaceous deposit from the catalyst particles in a separate regeneration zone, withdrawing a stream of regenerated catalyst particles containing from 1.0 to 4.0 wt. per cent of carbon from the regeneration zone and recycling the same to the reaction zone.

2. A method of hydroforming a hydrocarbon fraction boiling within the motor fuel boiling range which comprises passing naphtha vapors in admixture with hydrogen-rich gas through a dense, fluidized bed of finely divided group VI metal compound hydroforming catalyst in a reaction zone at temperatures of 900°–1000° F. and at pressures of 200–250 lbs. per sq. inch at a catalyst to oil ratio of 5 to 10 and at a throughput of 0.5 to 1.0 w./hr./w., withdrawing a stream of reaction products substantially free of catalyst particles overhead from the reaction zone, withdrawing a stream of catalyst particles directly from the dense fluidized bed in said reaction zone, stripping adsorbed hydrogen and hydrocarbon material from the withdrawn catalyst, regenerating the stripped catalyst particles by burning off at most only a part of the carbonaceous deposit from the catalyst particles in a separate regeneration zone, withdrawing a stream of regenerated catalyst particles containing from 1.5 to 2.0 wt. per cent of carbon from the regeneration zone and recycling the same to the reaction zone.

3. The method as defined in claim 1 wherein the catalyst comprises molybdenum oxide upon a spacing agent 4. The method as defined in claim 2 wherein the catalyst comprises molybdenum oxide upon a spacing agent.

References Cited in the file of this patent

UNITED STATES PATENTS

| 1,967,636 | Towne | July 24, 1934 |
| 2,253,486 | Belchetz | Aug. 19, 1941 |
| 2,353,119 | Workman | July 4, 1944 |
| 2,410,891 | Meinert et al. | Nov. 12, 1946 |
| 2,419,323 | Meinert et al. | Apr. 22, 1947 |
| 2,578,704 | Houdry | Dec. 18, 1951 |